July 22, 1941. M. K. BUCHANAN ET AL Re. 21,860

ICE CUBE PAN Orig. 2,043,881

Original Filed July 25, 1933 2 Sheets-Sheet 1

WITNESSES

INVENTORS
M. K. Buchanan
BY A. G. Horton
Munn, Anderson, Stanley
Foster & Lidy
ATTORNEYS July 22, 1941. M. K. BUCHANAN ET AL Re. 21,860

ICE CUBE PAN

Original Filed July 25, 1933 2 Sheets-Sheet 2

WITNESSES

INVENTORS
M. K. Buchanan and
A. G. Horton
BY
Munn, Anderson, Stanley, Foster & Lilly,
ATTORNEYS Reissued July 22, 1941

Re. 21,860

UNITED STATES PATENT OFFICE 21,860

ICE CUBE PAN

Michael K. Buchanan and Albert G. Horton,
Norfolk, Va.

Original No. 2,043,881, dated June 9, 1936, Serial No. 682,157, July 25, 1933. Application for reissue July 17, 1937, Serial No. 154,304

34 Claims. (Cl. 62—108.5)

The invention relates to an ice cube forming device.

The invention relates to an ice cube molding device of the type used in domestic mechanical refrigeration for forming the so-called ice cubes of a size suitable for table use and in which a mold forming grid is contained in an open top pan to give shape to the ice cubes as they are formed.

The primary object of the invention is to provide a simple form of grid construction by means of which the ice cubes may be conveniently and easily broken away from the device by manual action.

Broadly this is attained by a two-step sequential manually effected operation in which the formed ice cubes are first separated from the pan by breaking the ice seal between the cubes and the pan and then by breaking the ice seal between the ice cubes and the grid to thus free the cubes completely from the device.

In order to attain this sequential ice cube releasing action the invention features the providing of a form of grid of two interlapped and relatively movable members, the lowermost member hereinafter referred to as a restrained follower having a limited upward movement from the pan and acting to break the contained ice cubes therefrom and the uppermost, hereinafter referred to as a plow, having a continued upward movement and acting on the cubes so freed from the pan to break the ice cubes from the restrained follower and thus from the grid.

Various other objects and advantages of the invention will be in part obvious from an inspection of the accompanying drawings and in part will be more fully set forth in the following particular description of one form of device embodying the invention, and the invention also consists in certain new and novel features of construction and combination of parts hereinafter set forth and claimed.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

Figure 1:
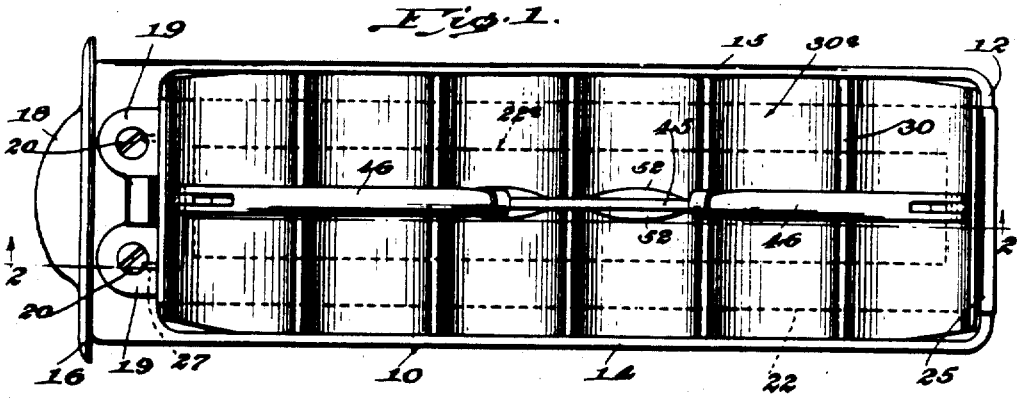
Fig. 1 is a plan view of an ice cube molding device constructed in accordance with the principles of the invention.

Referring more particularly to the drawings, 10 designates an ice cube pan having end walls 11 and 12, a bottom 13 and side walls 14 and 15. A finishing plate 16 is secured to a reinforcing block 17 which is secured to or formed integrally with the end wall 11. The finishing plate 16 is provided with a lip 18 which is adapted to be grasped by the fingers for removing the ice cube pan from the refrigerator.

A reinforcing block 19 is secured in any approved manner, as shown at 20, to the reinforcing member 17.

Located within the pan 10 is a two-part grid for molding the ice cubes. The grid comprises an upper member or longitudinally extending plower 29 and a lower member or restrained follower 21 with transverse partitions 30. The lower member 21 includes a reinforcing base member 22 which lies in flat contact with the bottom 13 of the pan. The member 22 is provided at opposite ends with vertical extensions 23 and 24 which extend upwardly and are in flat contact with the adjacent end walls of the pan. The extension 24 is provided with a lip 25 which extends over a returned flange 26 at the upper edge of the end wall 12.

A pair of horizontally spaced lugs 27 are secured to the outer face of the extension 23 of the base member 22 and project into vertically extending and horizontally spaced slots 28 in the adjacent end wall of the pan 10 and in the reinforcing member 17. Where the reinforcing member 17 is formed integrally with the end wall 11 of the pan the slots 28 are cut directly into the reinforcing member. On the other hand where the reinforcing member 17 is formed separately from the pan and secured thereto the slots 28 are formed in the end wall and the reinforcing member.

A sheet of flexible material is bent at intervals to provide transverse partitions 30 and rounded bottom portions 31. The bent portions which form the partitions 30 are secured together in any approved manner. One end of the strip of metal which has been bent to form the partitions 30 is secured at 32 to the vertical extension 23. The opposite end 33 of the strip of material is secured to the extension 24. The rounded portions 31 are secured as at 34 to the base member 22. It will be noted that the base member 22 and the extensions 23 and 24 are of less width than the pan and likewise of less width than the transverse partitions 30.

Each of the partitions or walls 30 is provided with a vertical slot 35 and these slots extend downwardly and into the rounded portions 31 for a purpose which will be presently explained.

A reinforcing bar 40 is secured to the base member 22 along its lower edge and has its ends 41 secured to the extensions 23 and 24. The reinforcing bar 40 passes through the lower ends of the vertical slots 35 and also passes through the end portions 33.

Figure 7:
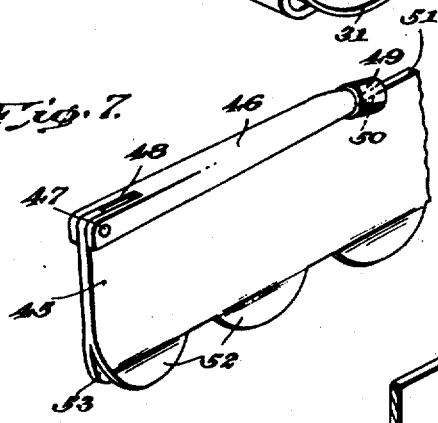
Fig. 7 is a fragmentary view in perspective of the upper grid member shown in Figs. 1 to 3, inclusive.

The upper member or plow 29 is shown more particularly in Fig. 7 and consists of a metal plate 45 having a lever 46 pivotally connected at its upper end and near the upper edge as shown at 47. The lever is bifurcated at 48 and cut away to receive the upper end of the plate 45. The lever is provided with a finger piece 49 which is likewise grooved at 50 so that it will neatly rest upon the upper edge 51 of the plate 45.

The lower edge of the plate 45 is provided with flared lips or flanges 52 so that a space 53 is provided between a pair of lips located upon opposite faces of the plate 45 to receive the reinforcing member 40 and these lips, as shown in Fig. 1, extend outwardly from the plate or wall 45 and form projections upon which the ice cubes rest so that when the plate 45 is elevated these lips will aid in raising the cubes from the pan. Because of the wedging action of the flanges 52 the cubes will be forced outwardly towards the side walls of the pan and away from the plate 45. These flanges in effect form inclined walls at the opposite faces and adjacent the lower edge of said plate.

Figure 8:
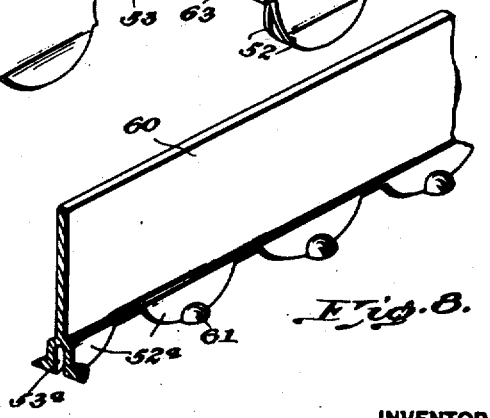
Fig. 8 is a fragmentary view in perspective of a modified form of the grid member shown in Fig. 7.

A modified form of the upper grid member is shown in Fig. 8. In this form the lower edge of plate 60 corresponding to plate 45 is provided with lips 52ᵃ located in vertical planes and spaced from each other to provide a groove 53ᵃ to receive the reinforcing bar 40. Semi-spherically shaped beads 61 are formed at the lower ends of the lips and these beads provide a lifting surface or a support for the cubes. The plate 60 is also provided with levers 46 for raising the grid and for raising the plow from the grid member containing the transverse partitions 30.

Figure 2:
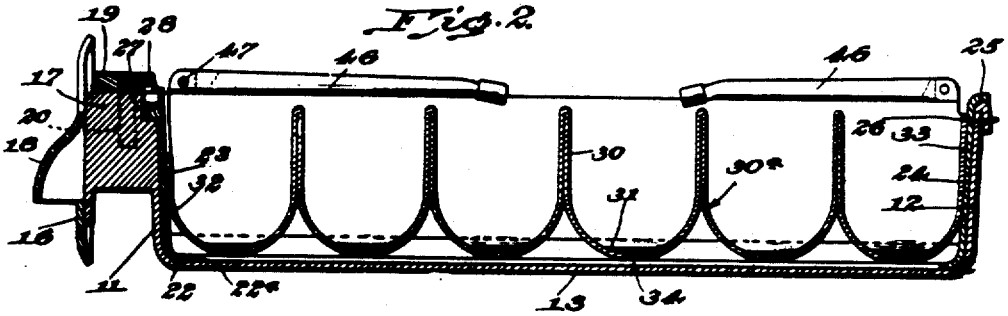
Fig. 2 is a longitudinal vertical section taken along the line 2—2 of Fig. 1 showing the grid in position.
Figure 3:
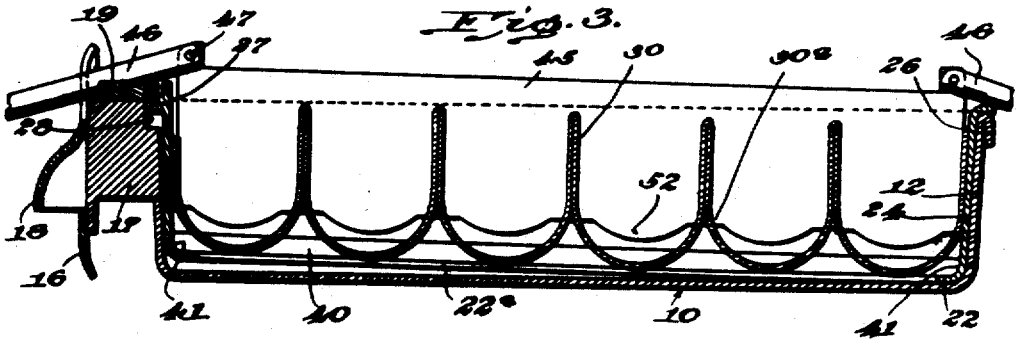
Fig. 3 is a similar longitudinal vertical section showing the grid elevated for breaking the cubes loose from the pan and from the grid.
Figure 6:
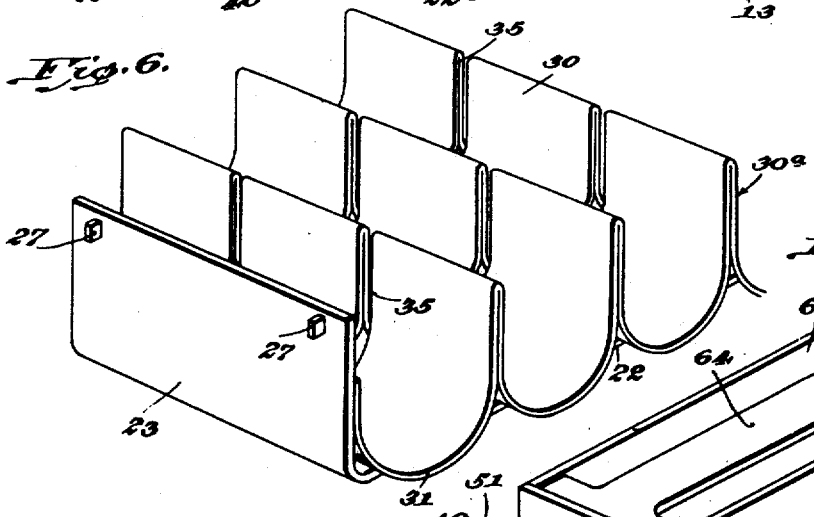
Fig. 6 is a fragmentary view in perspective of the lower grid member adapted for use with an upper grid member of the type including a plurality of longitudinally disposed walls.

Fig. 6 shows a lower grid member which is similar in all respects to the lower grid member shown in Figs. 1 to 3, inclusive, except that the transverse partitions 30 are provided with a pair of slots 35, thereby increasing the number of ice cube cells in the pan.

Figure 4:
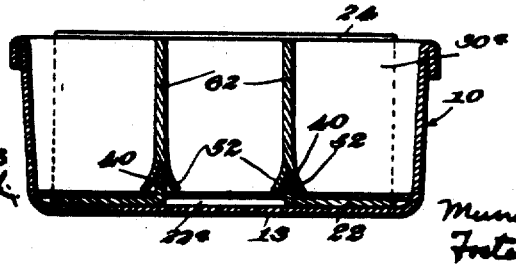
Fig. 4 is a transverse vertical section of a modified form of the invention.

In Fig. 4 is shown a transverse section of the device containing the grid for increasing the number of cells over those shown in Figs. 1 to 3, inclusive.

Figure 9:
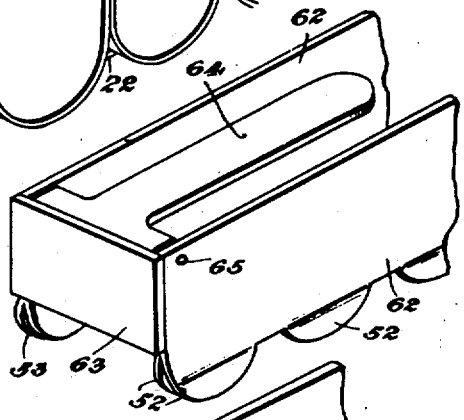
Fig. 9 is a fragmentary view in perspective of the modified form of grid member used in connection with the grid member shown in Fig. 6.

The upper grid member or plow which is adapted to be employed in connection with the grid member shown in Figs. 4 and 6 is disclosed in Fig. 9 and contains a pair of plates or walls 62 with their opposite ends connected by transverse walls 63. A lever 64 is pivoted at 65 between the opposite ends of the walls 62 and adjacent the reinforcing walls 63. Each of the walls 62 is provided with lips 52 having a slot therebetween which is adapted to receive the reinforcing bars 40 which in this instance will be two in number. In other words, where larger pans are employed there will be a greater number of cells and the number of cells is controlled by the number of division walls 62 as shown in Fig. 9.

Figure 5:
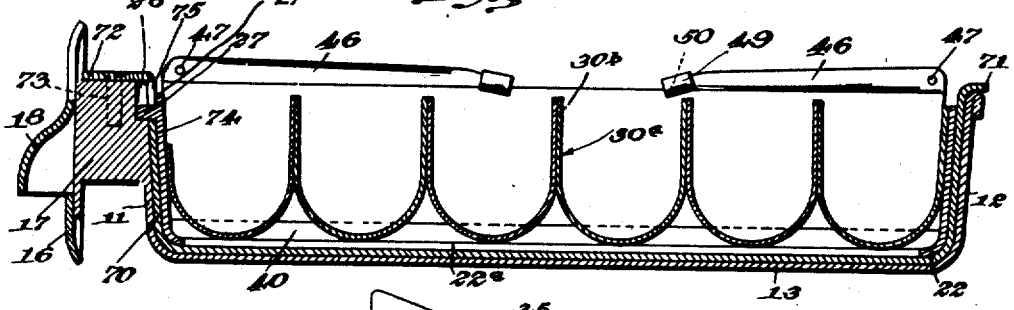
Fig. 5 is a longitudinal vertical section of a further modified form of the invention.

In the modified form shown in Fig. 5, a reinforcing member 70 is employed which forms a liner for the bottom 13 and end walls 11 and 12 of the pan. This liner rests upon the bottom 13 and in flat contact with the end walls 11 and 12 of the pan. One end of the liner, as shown at 71, is provided with an outturned flange which engages over the top of the end wall 12. The opposite end of the liner is provided with a flange 72 which is brought over the top of the reinforcing member 17 and secured to the reinforcing member in any approved manner as shown at 73. One end wall 74 of the liner is provided with slots 75 into which the lugs 27 project. The transverse partitions 30ᵇ are in contact with each other but are not connected together at their upper edges so that these partitions are movable relative to each other and are so moved when the cubes are forced from the grid members.

The operation of the device is as follows: Water is placed in the pan after the grid has been placed in position and the device is then placed in the refrigerator. As soon as the water is frozen the pan is removed from the refrigerator and the levers 46 are raised and moved outwardly over the end walls of the pan. As shown in Figs. 1 to 3, inclusive, the outer ends of the levers are forced downwardly with the block 19 and the lip 25 acting as fulcrums. When a slight pressure is placed on the ends of the levers both of the grid members which are locked together by the frozen cubes will be raised as a unit through a distance which is permitted by the slots 28. Said levers in Figs. 1 to 3, inclusive, will engage the free edge 27ᵃ of the extension of the base member of the lower grid member and this edge acts as a cam or fulcrum in the initial stages of separating the grid members so that the lower grid member is held against further upward movement while the upper grid member 45 is being moved outwardly of its nested position within the lower grid member. When this happens the ice cubes are broken loose from the side walls of the pan. Further movement of the levers will cause the upper grid member 45 to be moved outwardly from the lower grid member and cause the cubes to be broken from the members so that the cubes may be readily lifted from both of the grid members in the pan.

It will be seen by this construction that the slight movement of the lower grid member will release the cubes from the pan while retaining the grid members locked together until the levers 46 are operated sufficiently to cause the upper grid member 45 to break the cubes loose from both of the grid members.

The operation of the device shown in Figs. 4 and 6 with the additional ice cube cells will be substantially the same as the operation of the device shown in Figs. 1 to 3, inclusive.

In the construction shown in Fig. 5, the reinforcing flange 72 on the liner 70 and the flange 71 will act as fulcrums for the levers 46 so that the strain incidental to breaking the cubes loose will be exerted upon the liner and not upon the pan.

The grid member in the form shown at 60 is provided with rounded projections 61 which when one end of the grid member is tilted will tend to revolve in the pockets formed in the ice cubes where these projections are located when the grid member is being raised.

The transverse partitions as have been previously described have a slight movement relative to each other when the cubes are forced out of the pan and this movement facilitates the removal of the cubes because of the fact that the slight movement of the transverse partitions tends to shift the cubes when the upper grid member 45 is being elevated from the lower grid member. This movement has the same effect as if the transverse partitions were tapered from the inner ends at the plate 45 to the outer ends.

The operation as previously described refers to the simultaneous use of both levers 46 but in order to move the lower grid member 21 from its seated position shown in Fig. 2 into its tilted position shown in Fig. 3 only the left lever need be actuated. Pressing down on the left lever which at such time is substantially in a horizontal position has the effect initially of shearing the extension 32 from any ice which may have formed in the joint between the extension and the end wall 11 of the pan and of shearing from the wall 11 whatever portions of the end ice cubes which may be in contact with this wall.

The continued action of the lever apparently strains the adjacent end of the base member 22 upwardly away from the bottom of the pan despite the presence of the reinforcing bar 40 and as a result there is a resulting separating of the base member 22 progressively from left to right of the showing in Fig. 3 and eventually both the base member is separated from the bottom 13 and the ice cubes have separated from the sides of the pan long before the Fig. 3 position of the lower grid member has been reached. It is understood, of course, that there is no bodily movement of the different parts of the grid members but more in the nature of an infinitesimal strain or spring of the relatively rigid base member but this is all that is necessary to break the adhesion of ice to a metal member especially when the ice has been sharply frozen.

The base members 22 in all of the forms are provided with elongated slots 22ᵃ so that it will be possible to readily clean the outer surfaces of the rounded portions 31 of the cells when desired. The opposite ends of the rounded portions 31 of the cells are secured to the metal of the base members located at each side of the slots 22ᵃ.

As shown in Fig. 4, the metal of the base member 22 at each side of the slot 22ᵃ is bent upwardly to form the reinforcing bars 40.

In all of the forms it will be readily apparent that when the grid members are locked together by the ice cubes that the initial movement of either lever or both levers will cause the frozen cubes to be broken loose from the inclined side walls of the pan and when the grid members have been raised sufficiently to break the cubes loose the side walls of the cubes will be slightly spaced from the side walls of the pan. In this initial movement the left lever 46 will be in engagement with an end of the pan so that further outward rocking movement of the lever will cause the lever to engage the edge 27ᵃ of the extension of the stationary grid member having the transverse walls so that the edge 27ᵃ will act as a cam for preventing further upward movement and being engaged by the lever 46 will act as a cam or fulcrum to prevent further upward movement of the grid member having transverse walls regardless of the cooperating stops 27 and 28 and therefore the last mentioned grid will at this time be retained against further upward movement while the grid member 45 may be elevated to the position shown in Fig. 3. This action of the lever at this time upon the free edge 27ᵃ of the extension will tend to move the grid member having transverse walls downwardly while the grid member 45 is moved upwardly and the cubes are broken away from the grid members. The continued rocking of the levers 46 will further elevate the cubes which are now in a free state and may be readily removed either by hand or by the tilting of the pan.

The wedge-shaped faces of the flanges 52 when the grid 45 is being moved upwardly from the other grid will tend to shift the cubes towards the inclined side walls of the pan and these inclined side walls will tend to force the cubes laterally, thereby facilitating the breaking of the cubes from the grid members.

We claim:

1. In an ice cube pan, a grid having a plurality of transverse partitions walls and a plurality of longitudinally extending walls, means for connecting the partitions to an end wall of the pan to provide for a limited outward movement of the partitions, and means for raising the longitudinally extending walls and the partitions through a limited movement for breaking the ice cubes loose from the pan.

2. In an ice cube pan, a plurality of grid members movable relative to each other, means for limiting movement of one of the grid members, and means for raising the other grid member from the first mentioned grid member while causing limited movement of said first mentioned grid member for breaking the ice cubes loose from the grid members and pan.

3. In an ice cube pan, a plurality of grid members movable relative to each other, one of the grid members having walls formed of flexible material so that said walls may be moved relative to the walls of the other grid member when the other grid member is moved outwardly from the first mentioned grid member and means for moving both of the grid members relative to the pan and then the second mentioned grid member relative to the first mentioned grid member and the pan for breaking the ice cubes loose from the pan and grid members.

4. In an ice cube pan, a plurality of grid members movable relative to each other, one of said grid members having walls formed of flexible material so that said walls may have a movement relative to the walls of the other grid member, means for limiting outward movement of the first mentioned grid member, means for moving the grid members outwardly of the pan until the limiting means prevents further movement of the grid members for breaking the cubes from the pan, further actuation of the moving means causing the second mentioned grid member to be moved away from the first grid member for breaking the cubes loose from the grid members.

5. In an ice cube pan, a reinforcing member forming a liner for the bottom and end walls of the pan, means for securing one end of the liner to an end wall of the pan, a plurality of grid members movable relative to each other, one of the grid members having limited upward movement in the pan and resting on the liner, the other grid member being movable away from the first mentioned member.

6. In an ice cube pan, a reinforcing member forming a liner for the bottom and end walls of the pan, said liner at each end having a lip extending over an adjacent end wall of the pan, means for securing a lip to one end wall, a plurality of grid members in the pan, one of the grid members resting on the liner, a lever pivotally connected to each end of the other grid member, the last mentioned grid member being movable from the first mentioned grid member, the lips on the liner acting as fulcrums for the levers when said levers are actuated to force the last mentioned grid member from the first mentioned grid member for breaking the cubes loose from the pan and grid member.

7. In an ice cube pan, a grid having a plurality of transverse walls, a second grid member having a longitudinal wall and forming with the transverse walls a plurality of ice cube cells, a base member having an elongated opening and secured to the bottoms of the transverse walls.

8. In an ice cube pan, a grid member having limited upward movement in the pan, means for limiting movement of the grid member to a predetermined height above the bottom of the pan, and means for causing relative movement between the grid member and the pan whereby ice cubes will be broken loose from the grid member and the pan.

9. In an ice cube pan, a plurality of grid members movable relative to each other and to the pan, one of the grid members having an extension, a lever pivotally connected to one end of the other grid member and adapted to be rocked for fulcruming on one end of the pan for raising both grids slightly above the bottom of the pan for forcing the cubes free of the side walls of the pan, said extension adapted to be engaged by the lever as a fulcrum so that further rocking movement of said lever will retain the first grid member stationary while the other grid member is forced away from the first grid member for breaking the cubes from the grid member.

10. In an ice cube pan having inclined side walls, a grid member movable relative to the pan and dividing the pan into a plurality of ice cube molds, means for causing the pan and grid member to be moved relative to each other, the lower edge of the grid member having laterally disposed tapered flanges for not only aid in raising the cubes but for causing a lateral shifting of the cubes towards the inclined side walls of the pan, the flanges having substantially the width of a mold.

11. In an ice cube pan having inclined side walls, a plurality of grid members nested in each other and movable relative to each other and to the pan, the lower portion of one of the grid members having laterally disposed inclined surfaces on its opposite faces for not only creating a lifting effect on the cubes when said grid member is elevated but for causing a lateral shifting of the cubes towards the inclined side walls, said inclined surfaces having substantially the width of the cube, means for moving the grid members relative to the pan, and the first mentioned grid relative to the other grid for releasing the cubes frozen in the pan.

12. In an ice cube pan, a plurality of grid members nested in each other, a lever pivotally connected to one grid member and adapted to engage one end of the pan for raising both grid members in the pan sufficiently above the bottom of the pan to break the cubes loose from the side walls of the pan, the other grid member having an extension adapted to be engaged by the lever after the said grid member has been raised for retaining the said grid member against movement while the first mentioned grid member is moved away from the second mentioned grid member for breaking the cubes loose from said grid members.

13. A receptacle for producing ice particles comprising a pan and a grid structure flexible in part and dividing said pan into four corner cells and a series of intermediate cells disposed in rows and extending between said corner cells, said grid structure embodying a longitudinal, vertically disposed wall and a plurality of vertically disposed walls extending transversely from the longitudinal wall on opposite sides thereof, and handles attached to the ends of the longitudinal wall, at least one of said handles being formed to engage the pan to provide a lever system to raise the grid structure upwardly from the pan and to break the ice bond between the particles and the pan, both of said handles being effective to remove the ice particles from the grid structure.

14. In a grid for an ice tray comprising a longitudinal wall and flexible transverse walls, the lower edge of the longitudinal wall being bifurcated and a rigid reinforcing metallic element for the grid overlapped by the bifurcated lower edge of the longitudinal wall and said reinforcing element being secured to the grid only at spaced apart points along the bottom of the grid.

15. The combination of a tray, a grid fitted in the tray and comprising a plurality of partition-forming elements of flexible material, each substantially U-shaped in longitudinal section, a side wall of one element being in contact with but not connected to the adjacent wall of the next contiguous element and having a limited freedom of movement relative thereto, a bottom member connecting the elements at their bottoms, said walls provided with slots in longitudinal alignment and a relatively rigid longitudinal partition removably fitted in the slots and having projections therefrom protruding into the mold spaces formed within the flexible walled elements.

16. A receptacle for producing frozen ice cells comprising a pan and a grid structure therefor dividing said pan into four corner cells and a series of intermediate cells disposed in rows and extending between the corner cells, said grid structure embodying walls having their bottoms fixed relative to each other extending along opposite sides of said intermediate cells and each wall being formed of two flexible metallic sheets disposed in abutting relation with respect to each other and their upper edges capable of relative movement therebetween.

17. Apparatus for producing ice pieces including a tray, a grid fitted in the tray and comprising a longitudinal wall and a plurality of transverse walls, an adjacent pair of the transverse walls connected to each other and coacting with the longitudinal wall to form three sides of an ice mold, and manually actuated lever for engaging one end of the longitudinal wall and providing a mechanical advantage in separating the adjacent end of the grid from the tray and in separating the longitudinal wall from the transverse walls.

18. In a device of the class described, the combination of a long, narrow, shallow pan having upstanding outlining walls free of obstruction between the walls, means at the opposite narrow ends providing upwardly exposed bearing surfaces, a grid for dividing the pan into a plurality of ice forming molds, said grid including an upstanding structure extending longitudinally down the center of the pan and dividing the same substantially into two equal parts, transverse partitions extending in parallel and spaced apart relation between said central structure and the adjacent long side walls of the pan to form a plurality of ice cube molds on opposite sides of the central structure, said transverse partitions being movable relative to each other to permit the ice cubes to be readily removed from the molds after they have been separated from the bottom of the pan, and a pair of rod-like levers pivoted to the central structure adjacent its opposite ends and each lever adapted to be swung into position bearing down on the adjacent bearing surface to elevate from the pan the part of the central structure to which the lever is pivoted and thus break from the pan the ice adhering to the said part.

19. A grid for ice cube trays comprising relatively movable sections to partition the interior of said trays, said sections each having a longitudinal member, said members adapted to lie in a common plane within the tray, said grid having lateral elements carried by one of said members and being of such depth as to project over the longitudinal member of the other grid section, the sections of said grid being relatively movable to permit said longitudinal members to be at least partially separated.

20. A grid for ice cube trays, including a lower section including a member extending longitudinally in a tray, an upper section including a longitudinal member adapted to lie in a common plane with said lower member, laterally extending elements on the longitudinal member of said upper grid section, said elements extending below the bottom of said longitudinal member of the upper section and having slots extending upwardly to receive said bottom section therein, said grid sections being relatively movable to permit the cubes to be released from the tray.

21. A grid for ice cube trays, including a lower section including a longitudinal vertically disposed member in a tray, an upper section including a longitudinal member and laterally extending projections, said projections extending below the bottom of said second longitudinal member and having slots to receive said bottom section therein, said grid sections being relatively movable to permit the cubes to be released from the tray.

22. A grid for ice cube trays, including a lower section having a longitudinal vertically disposed member, a relatively movable upper section including a longitudinal member adapted to lie in a common plane with said lower member whereby said longitudinal members constitute a single vertical wall and laterally extending projections on the longitudinal member of said upper grid section, said projections extending below the bottom of said last named longitudinal member.

23. An ice cube pan having a first grid member, a second grid member cooperating with the first grid member to form ice cube cells, means for raising the second grid member to break the ice cubes loose from the pan and grid members, cooperating means on the pan and first grid member to provide for a slight upward movement of the first grid member when the raising means is actuated, the cooperating means retaining the first grid member from further movement while the second grid member is forced outwardly from the first grid member.

24. An ice cube pan having a first grid member, a second grid member, means for raising the second member to break the ice cubes loose from the pan and the grid members, cooperating means on one end of the first grid member and an end wall of the pan to provide for limited outward movement of the first mentioned grid member when the raising means for the second grid member is initially actuated.

25. An ice cube pan having a first grid member, a second grid member, means for raising the second grid member to break the ice cubes loose from the pan and the grid members, cooperating means on one end of the first mentioned grid member and an adjacently disposed end wall of the pan and including slots and lugs to provide for limited outward movement of the first grid member when the raising means for the second member is initially actuated.

26. In an ice cube pan, a grid including a first grid member and a second grid member, means for raising said second grid member, means for loosely connecting one end of the first grid member with an end wall of the pan to provide for a limited outward movement of the first grid member during the initial actuation of the raising means.

27. A grid to divide the interior of an ice cube tray into individual cube compartments, including a lower section having a longitudinal member, an upper section including a longitudinal member having laterally extending projections projecting below the longitudinal member of the upper section and having slots extending upwardly from the bottom of the projections to receive therein the longitudinal member of the bottom section, both grid sections lying unattached to each other when in said tray, and lever means acting directly on said grid sections to cause a relative movement of said grid sections.

28. A grid to divide the interior of an ice cube tray into individual cube compartments, comprising a lower section including a longitudinal member, an upper section including a longitudinal member having laterally extending projections, arranged to receive said lower longitudinal member, said upper and lower sections being relatively movable within the tray, and lever means arranged to press downwardly on said lower grid section and upwardly on said upper grid section to cause a relative movement of said grid sections.

29. In a liquid congealing apparatus, the combination of an ice tray, means including longitudinal and transverse elements for dividing the interior of the tray into compartments for forming separate particles of ice, said means being formed at least in part of parallel flexible metallic walls and one of said elements comprising a substantially straight metallic wall member extending longitudinally of the tray and having an upper portion disposed in a general vertical direction with a lower substantially flat portion disposed at a small angle to the vertical portion and substantially filling the space between two adjacent transverse elements and assisting in lifting the frozen ice away from the ice tray when said wall member is raised and a lever acting on said wall member for forcefully breaking the bond between the ice and the ice tray when said wall member is raised relative to the ice tray.

30. In an ice cube forming device, the combination of an open top tray, a grid lying loose in the tray and dividing the interior of the tray into a plurality of ice cube forming molds, said grid including a lower section comprising a longitudinally extending flat plate having an upwardly extending end provided with a lever engaging member, an upper section having a longitudinal member having a lever engaging member on an end thereof, said grid having laterally extending elements and a lever adapted to mutually react on said engaging members on the grid sections to cause a relative movement of said grid sections.

31. In an ice cube forming device, the combination of an open top tray, a grid in the tray and including two relatively separable units, one constituting a plurality of transversely extending partitions, certain of said transverse partitions provided with aligned vertically extending slots and the other constituting a longitudinal partition located in said slots and intersecting said slotted partitions to form a plurality of ice cube forming molds, the unit comprising the transverse partitions being free at all times to rise from their ice locked engagement with the tray and a manually actuated leverage means reacting between the two units to force one upwardly and the other downwardly, causing the longitudinal partition to move relative to the slotted partitions to break the adhesion of the formed ice cubes to the device.

32. A device for molding ice cubes including a pan to hold water and a grid therein to form therewith a plurality of ice molding compartments, said grid comprising a plurality of partitions separable from and bodily movable relative to each other and to the pan, and power multiplying means reacting between the pan and grid to move all of the grid as a unit relative to the pan to break the ice in the compartments free from the pan and also reacting between the relatively movable partitions to shift them from the position they occupied relative to each other while forming the ice thereby to break the ice in the compartments free from the partitions.

33. Apparatus for producing ice pieces comprising a tray and a grid for dividing the tray into a plurality of ice cells, said grid including two longitudinally extending backbone elements movable relative to each other and to the tray, and a plurality of transverse walls carried by one of said elements free to move up from the bottom of the tray when ice particles are attached thereto, both of said elements extending for the major portion of the length of the tray interior and at least one of said members providing for rigidity in a vertical plane, and force multiplying means reacting between said longitudinal elements to effect relative movement between them.

34. A grid for ice cube trays, including a section extending longitudinally of a tray and including an upstanding element, another section having a longitudinal element adapted to lie in the same plane with and above said first named element, one of said sections having lateral fins to form partitions in the tray, said sections being relatively movable to permit the cubes to be released from said grid.

MICHAEL K. BUCHANAN.
ALBERT G. HORTON.